April 27, 1926.
G. G. NAUGLE
TIRE CHAIN COUPLER
Filed July 14, 1924
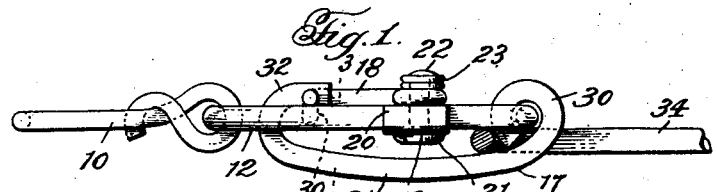
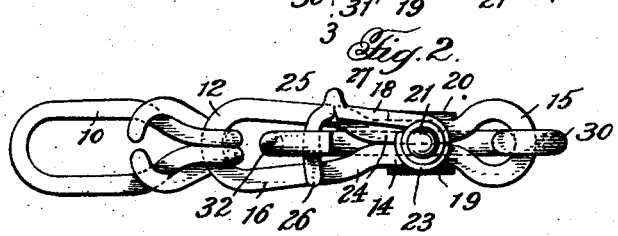
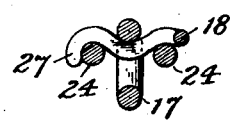
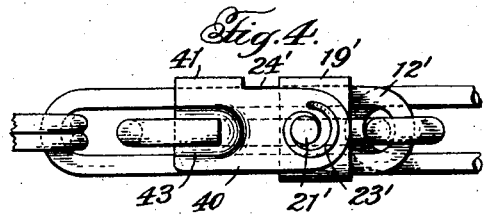
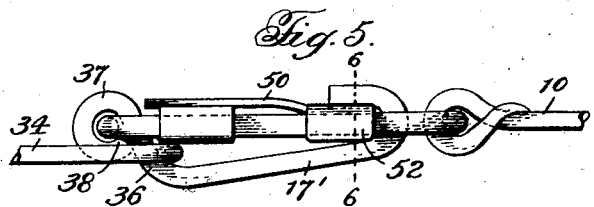
1,582,874

Patented Apr. 27, 1926.

1,582,874

UNITED STATES PATENT OFFICE.

GIRARDUS G. NAUGLE, OF YORK, PENNSYLVANIA, ASSIGNOR TO CARLTON L. HOFF, OF YORK, PENNSYLVANIA.

TIRE-CHAIN COUPLER.

Application filed July 14, 1924. Serial No. 725,934.

*To all whom it may concern:*

Be it known that I, GIRARDUS G. NAUGLE, a citizen of the United States, residing at York, in the county of York and State of Pennsylvania, have invented certain new and useful Improvements in Tire-Chain Couplers, of which the following is a specification.

This invention relates to a chain coupler or fastener particularly adapted for use in connection with non-skid tire chains, and has for its principal object the provision of a fastener which is simple and at the same time proof against accident.

A further object of the present invention is the provision of a fastener of the type described in which the lever and take-up portion of the fastener is entirely separate and independent of the latch or locking device. A still further object of the invention lies in the provision of a fastener in which the lever is in the center of the body of the coupler and in which the lock of the lever is independent of the body but is attached to and protected by it. Other objects of the invention have to do with the specific details of construction and will be apparent from the following description and the claims:

In the drawing:

Figure 1 is a view looking to the side of the coupler body.

Figure 2 is a similar view, but looking edgewise on the lever, in a direction which we will call down, making this figure a top plan view.

Figure 3 is a section taken on line 3—3 of Fig. 1.

Figure 4 is a view similar to Figure 2, but showing a modification.

Figure 5 is an elevation of a modification which omits the spring as a separate element, and Figure 6 is a section therethrough.

In the drawings, 10 represents a side chain link of usual construction, embracing a welded link 12, the sides of which between their ends are brought into substantial parallelism, as at 14, forming at one end a relatively small lever receiving eye 15, and at the other end of the link a considerably larger opening 18, the latter receiving the hook end of a lever 17 and also the latching or locking end of the latch 18.

At its constricted portion the body of the link or coupler 12 is embraced by a trough-like member 19, having a flat bottom portion, at each side of which is an upstanding flange 20, of approximately the same height as the diameter of the wire from which the body of the coupler is formed.

The latch 18 is pivoted on a stud 21 carried by the support or trough member 17, between the head 22 of which, and the pivoting eye of the latch, is a spring 23 holding the latch in frictional contact with the two sides 24 of the coupler 12, and serving to hinder pivotal movement of the latch. The free end of the latch ends in a transverse arm 25, the end 26 of which rests on one of the sides 24 of the coupler. A downwardly curved locking depression 30 is formed between the end 26 and the longer arm of the latch, such depression having its central portion midway between the two sides 24 of the coupler link 12. It will be seen that this depression of the latch forms in effect a spring pressed lock, as it enters into the space between the two sides of the coupler and the spring holds it in position; in other words, the spring which, when the latch is to one side of the coupler, offers appreciable resistance to pivotal movement of the latch, holds the latch very securely in place when the parts are in normal position as illustrated in the various figures, since to free the latch it is necessary to raise its free end against the action of the spring a sufficient amount to allow the apex or vertex on the opposite side of the depression to pass over the side portion of the coupler, during which operation the sloping side of the depression forming bend is bearing with constantly increasing friction on the side 24. The latch 18 may be L-shaped, but I prefer to form a projection 27 at the bend to insure one-way-only operation of the latch as a safety-first feature.

The lever 17 is preferably of larger gauge wire than the coupler and is formed with an eye 30 at one end, encircling the coupler through the opening 15, allowing very free movement. The main portion 31 of the lever is substantially straight and ends in a hook 32 normally resting in the depression 30 of the latch and being held in such position under strain exerted by the link 34 at the end of the side chain tending to move the hook of the lever downward, as seen in Fig. 1. This hook on the end of the lever adds materially to the convenience in putting on the chain and in making adjustment thereof as the hook will retain either an inside or an outside chain when making adjustment for equal stress.

It will be noted that the free end of the eye 30 is bent inwardly of the coupler body 12, in the form shown in Fig. 1, while in modifications shown in Figs. 4 to 6 inclusive, the free end of the lever 17' is bent upwardly as at 36, then counterclockwise, as seen in Fig. 5, as at 37, and the tip 38 is bent against the portion just beyond the angle at 36 to close the eye. With such form of lever, the end link 34 bears against a shoulder of the lever while in Fig. 1 this end link bears against the tip of the lever tending to make the eye smaller. It will readily be understood that these two forms are interchangeable and I may if desired use the form of lever 17' in the preferred form or I may use the lever 17 with either the modified coupler or fastener of Fig. 4, or that of Fig. 5.

In Fig. 4, I have shown a coupler link 12', the sides of which are parallel throughout their entire length. In this modification, the support or saddle 19' has its two sides bent around the sides 24' of the coupler body, bracing the coupler, and if desired the support 19' may be welded or otherwise permanently secured to the coupler body. The stud 21' is secured to the cross piece support 19' and carries a head above the support, serving to confine a spring 23' against the sheet metal latch 40, which has an overhanging portion 41 at one side to engage the near side 24' of the body, this being a "safety first" feature, preventing the opening of the latch except by separation of the down turned portion 41 and the contacting side bar of the coupler. By placing the portion 41 to the road surface, accidents such as are sometimes caused by a pebble striking the fastener are obviated. The sheet metal latch 40 is depressed as at 43 to serve the same function as the depression 30 of the latch of the preferred type.

In Figure 5 the spring 23 as a separate element is eliminated. The sheet metal latch 50 which pivots on the stud 51 is of spring sheet steel and rather strongly engages the two sides 24' of the coupler body, the latter in this modification being exactly similar to the coupler body of Fig. 4. This modification also carries a portion 52 at one side, turned over to engage the side of the body of the coupler in order to make a one-way operation to open the latch, and as in the modification of Fig. 4, by using this side to the road surface, it will make the coupler a safety device in use. The hook portion 32' of this modification rests in a depression exactly similar to the depression 43 and is held in such position when the chain is under strain.

The hook end of the lever in the different modifications forms an important feature of the invention and it affords a very convenient manner of putting on the chains. When ready to assemble the chain as a whole on the tire, the hooks are caught in the end links 34 and will hold either an inside or an outside chain when making adjustment for equal stress. No tool is required and the construction is such as to allow for the adjustment of any link in the side chain, even those containing cross members, and since the body portion of the coupler is in each of the modifications made of wire, extreme flexibility at both ends is obtained when the coupler is attached to the chain and in use.

The lever is likewise made of wire and being contained in and supported by the end of the body, it affords a very flexible joint at this point and permits a maximum "take-up". By providing a lever and latch entirely separate and distinct from one another, important advantages are obtained over the ordinary forms of fasteners in which the lever and latch are invariably integral. By having these two members, that is the "take-up" portion of the fastener and the latch entirely separate and independent of one another, the fastener is made a positive safety lock in relation to the chain. The lock, since it lies inside of the chains and within the distance of the outside portion of the side chains in relation to the wheel, is afforded protection, to an extent not possible with the usual types.

What I claim is:

1. In a chain fastener, a coupler formed of a single piece of wire rod, a link retaining member mounted thereon and resiliently held, pivoted means for holding said link retaining member in operating position.

2. In a chain fastener, a coupler link, a member connecting the two sides of said link thereby forming two loops, a latch mounted between said loops, a member pivoted in one of said loops and having its free end projecting through the opposite loop, to be retained by said latch.

3. In a chain fastener, a coupler link, a member connecting the two sides of said link and forming two loops, a latch on said coupler link, a member pivoted in one loop and having a hooked end projecting through the opposite loop in position to be engaged by said latch.

4. In a chain fastener, a wire coupler having parallel side reaches, a link retaining member loosely secured to said coupler, a latch pivoted to said coupler and having a transverse arm extending across both of the side reaches of the coupler link, and having a depression in said transverse portion extending outwardly between said two side reaches of the coupler link, and having a depression in said transverse portion extending outwardly between said two side reaches, and a spring resiliently holding said depressed portion between said side reaches.

5. In a fastener, a welded link coupler, a lever secured thereto, a saddle engaging opposite sides of said welded link, and a latch pivoted in said saddle.

6. In a tire chain fastener, a coupler link having two parallel sides joined by a curved link end to which is secured in permanent fashion one end of the chain, a wire lever loosely pivoted to the other end of the coupler link, said lever having its two ends curved in the same direction with respect to the major body portion, one of the ends of the lever being closed to form an eye embracing the coupler link and the other only partly closed forming a hook, a transverse member, and an angular latch pivoted to the said transverse member having one arm extending from the pivot toward the permanently attached end of the chain, the other arm of the latch extending transversely across the two parallel sides of the coupler link to retain said lever in chain coupled position.

7. The device of claim 6 in which the transverse member is of sheet metal of trough shape, the flanges of the trough embracing the sides of the coupler link, and in which the pivoted latch is spring pressed to retain it in contact with the two sides of the coupler link when the latch is in lever holding position.

8. In a chain fastener, a wire coupler link with one link end adapted to have a chain connected thereto, a wire lever comprising a central straight portion adapted to extend substantially in line with the pull on the fastener and having the end adjacent the said link end bent into a hook adapted to pass between the sides of the coupler link, said lever adjacent its other end being bent substantially at right angles to the straight portion and on the same side with the hook extending between the sides of the coupler link to form a shoulder adapted to receive the other end of the chain connected to the said end of the link and to position the same between the straight portion and the coupler link, the end of the lever beyond the shoulder beng bent back upon itself in the direction of the bend of the hook end to form an eye encircling the other end of the coupler link whereby when in position the shoulder forming portion is between the attached chain end and the eye and strain from the attached chain is transmitted to the coupler link without tendency to open the eye, and locking means between the hook end and the coupler link for securing the lever against accidental displacement.

9. In a chain fastener, a wire coupler link including substantially parallel sides and connected ends with one end formed into a hook and the other end bent back to form an eye looped about the opposite end of the coupler link, the other end of the chain operatively connected to the eye forming end of the lever and in operation disposed between the lever and the coupler link and acting transversely through a part of wire forming the eye to transmit strains directly to the coupler link without tending to open the eye, and a latch extending between the parallel sides of the coupler link and positioned between the same and the hook end of the lever to secure the same in place.

10. A chain fastener including two parallel sides, a lever pivoted thereto, a cross saddle connecting the sides, a latch pivoted at one end to the saddle and having its free end movable across said parallel sides to secure the lever in position between the sides.

11. In a chain fastener, an endless, elongated wire coupler link, a lever pivoted to one end thereof, and the other end constituting a means for securing a chain thereto, the free end of the lever bent back to form a hook with its concaved side facing the link, adapted when the lever is distended to engage the other end of the chain secured to the link and adapted to draw said other end towards the link when the lever is swung from its distended position towards the link, and means for locking the lever in position lapping the link.

12. In a chain fastener, the combination of a wire link, a wire lever having one end formed into an eye encircling the link and having its other end bent with a hook facing the link when in position lapping the link, the portion of the lever between the eye and hook being straight and providing a smooth outer side free of obstructions to one side of the fastener and means for locking the lever in lapping position.

In testimony whereof I affix my signature.

GIRARDUS G. NAUGLE.